United States Patent [19]
Van Ee

[11] 4,427,099
[45] Jan. 24, 1984

[54] TORQUE CONVERTER CLUTCH WITH A TORQUE REVERSAL RELEASE VALVE ASSEMBLY

[75] Inventor: Richard J. Van Ee, Northville, Mich.
[73] Assignee: General Motors Corporation, Detroit, Mich.
[21] Appl. No.: 314,208
[22] Filed: Oct. 23, 1981
[51] Int. Cl.³ .............................................. F16D 3/66
[52] U.S. Cl. .................................................. 192/3.29
[58] Field of Search .............. 192/106.1, 106.2, 109 F, 192/3.28, 3.29, 3.3, 3.31

[56] References Cited
U.S. PATENT DOCUMENTS
4,167,993  9/1979  Vukovich et al. ................... 192/3.3
4,333,552  6/1982  La Marche ........................ 192/3.29

Primary Examiner—George H. Krizmanich
Assistant Examiner—Mark Manley
Attorney, Agent, or Firm—Donald F. Scherer

[57] ABSTRACT

A torque converter clutch is released from engagement when the direction of drive torque reverses from an engine drive condition to a vehicle coast condition. Upon torque reversal, a pair of staged or sequentially operated poppet type valves are opened to balance the fluid pressure in the apply and release chambers of the clutch to effectively cause clutch disengagement. The poppet type valves are opened to release the clutch by a cam surface disposed on the clutch vibration damper.

5 Claims, 4 Drawing Figures

TORQUE CONVERTER CLUTCH WITH A TORQUE REVERSAL RELEASE VALVE ASSEMBLY

This invention relates to torque converter clutches and more particularly to such clutches incorporating a valve assembly which enforces clutch release upon torque reversal.

There are many prior art valve structures which permit clutch release upon torque reversal. These valve structures range from being a single valve element to a plurality of valve elements which are simultaneously operated to provide clutch release when the direction of torque transmission through the clutch assembly is reversed. These prior art clutch release mechanisms, while they are effective, generally result in a slight driveline vibration or torque spike which is noticeable to the vehicle operator. The present invention seeks to eliminate this driveline disturbance by providing sequential opening of a pair of poppet type valve elements. This sequential opening is believed to provide a more stable pressure level within the clutch release chamber such that smooth disengagement of the clutch is attained.

It is therefore an object of this invention to provide an improved torque converter clutch assembly having a torque reversal release valve assembly wherein a pair of valve elements are sequentially opened upon torque reversal to permit pressure balancing between the clutch apply and release chambers.

It is another object of this invention to provide a torque converter clutch and release valve assembly wherein a pair of poppet type valves which control fluid flow between the clutch apply and release chambers are urged in the closed direction by spring members and are moved to the open position by a pair of cam members which are staggered angularly on the clutch damper assembly so that sequential or staged opening of the poppet valve is attained.

These and other objects and advantages of the present invention will be more apparent from the following description and drawings in which.

Figures 3, 4:
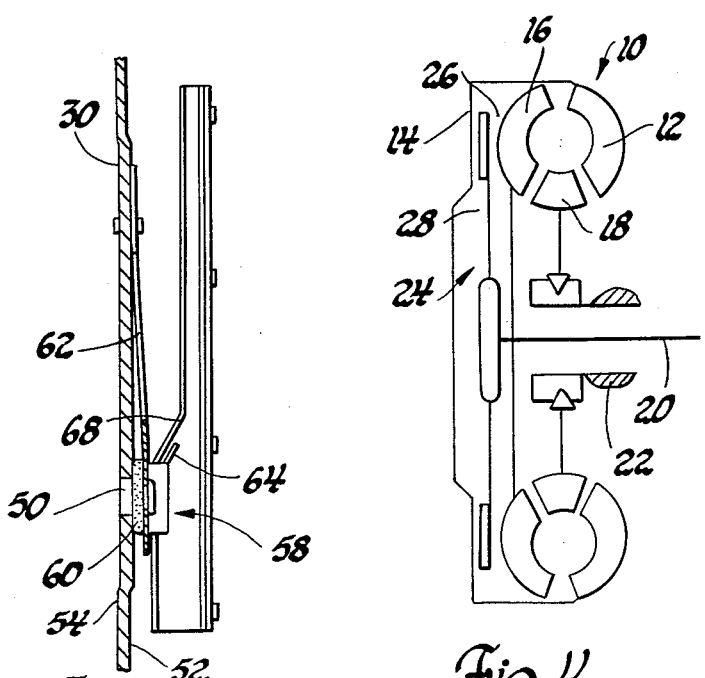
FIG. 3 is a view partly in section taken along line 3—3 of FIG. 1.
FIG. 4 is a diagrammatic representation of a torque converter and clutch assembly.

Referring to the drawings, wherein like characters represent the same or corresponding parts throughout the several views, there is seen in FIG. 4 a torque converter, generally designated 10, having an impeller 12 and an input shell 14 adapted to be driven by an internal combustion engine, not shown. The torque converter 10 also has a turbine 16 and a stator member 18 which are substantially conventional. The turbine 16 is drivingly connected to a shaft 20 while the stator 18 is connected to a stationary sleeve shaft 22 through a conventional one-way mechanism, as shown diagrammatically. The space between the turbine 16 and input shell 14 houses a torque converter clutch assembly 24 which separates the chamber into an apply chamber 26 and a release chamber 28.

As is well-known with torque converter clutches, the clutch is generally applied by fluid pressure delivered to the torque converter in a conventional manner such that apply chamber 26 is pressurized and release chamber 28 is exhausted. When the clutch 24 is fully applied, fluid flow from release chamber 28 is prevented. When it is desirable to maintain the clutch 24 disengaged, fluid fed to the torque converter is via release chamber 28 prior to entry into the torque converter proper. When chamber 28 is thus pressurized, the clutch 24 will be maintained out of engagement with the input shell 14.

With spark ignition engines, it is possible to utilize the carburetor throttle plate position or a vacuum signal responsive to inlet vacuum to provide for clutch release during closed throttle or vehicle coasting operation. However, with compression ignition engines, these signals are generally nonexistent and therefore, a torque reversal release valve is generally used to provide clutch disengagement during a driveline torque reversal.

Figure 1:
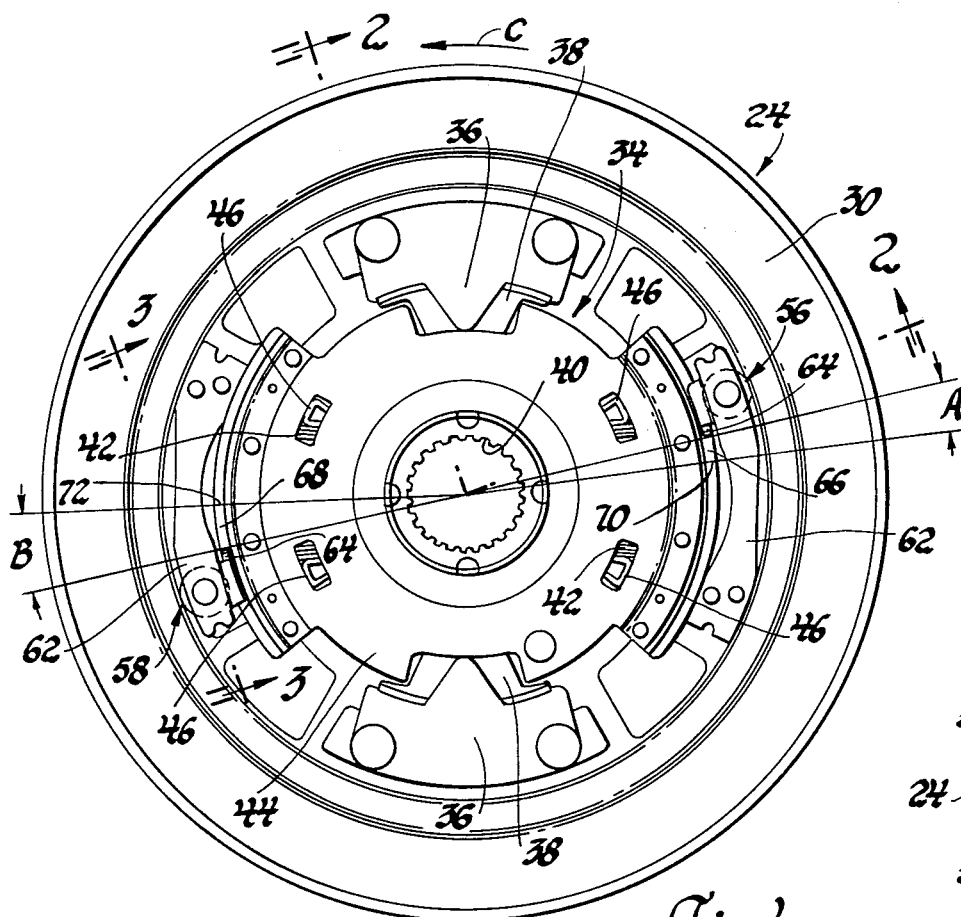
FIG. 1 is an elevational view of a torque converter clutch assembly.
Figure 2:
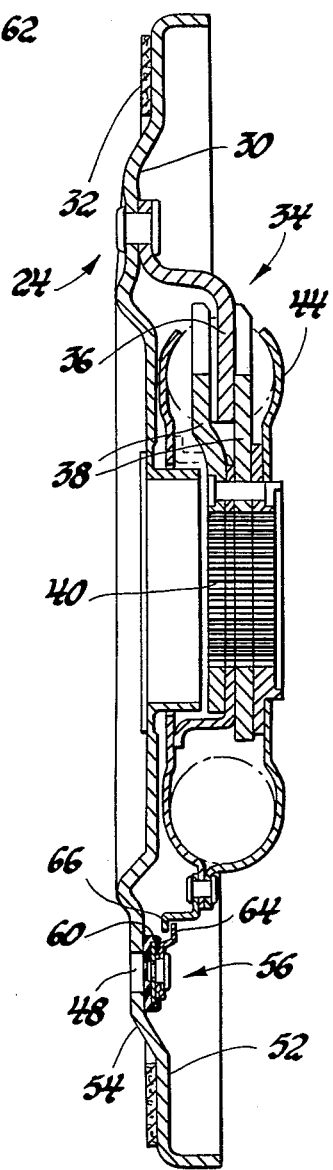
FIG. 2 is a sequential view taken along line 2—2 of FIG. 1.

As seen in FIGS. 1 and 2, the clutch 24 includes an annular pressure plate 30 to which is secured an annular friction facing 32 and a torsion damper assembly 34. The torsion damper assembly 34 includes a pair of input members 36 secured to the pressure plate 30 and a pair of output structures 38 which have a splined inner diameter 40 adapted to drivingly engage the shaft 20. A plurality of springs 42 are disposed in an equalizer housing 44 and are serially arranged by spacer wedges 46 to transmit torque from the input members 36 to the output members 38 while simultaneously damping driveline torsional vibrations. The use of vibration dampers in friction clutch assemblies with internal combustion engines is well-known.

The pressure plate 30 has a pair of openings 48 and 50 which provide fluid communication from the apply side 52 to the release side 54 of the clutch pressure plate 30. Fluid flow through these openings 48 and 50 is controlled by valve assemblies 56 and 58, respectively. The valve assemblies 56 and 58 can include a rubber or other pliable valve seat element 60 which is urged into seating engagement about the respective openings 48 and 50 by a leaf spring member 62 which is secured to the pressure plate 30. It will be appreciated that the valve assemblies 58 and 60 are not only urged to the closed position by the respective springs 62 but are also urged in a closed position by fluid pressure coating in the apply chamber 26 which is effective in the apply side 52 of the pressure plate 30.

The valve assemblies 56 and 58 each include a cam element 64 which are disposed adjacent a pair of cam surfaces 66 and 68. The cam surface 66 is effective to operate valve assembly 56 while cam surface 68 is effective to operate valve assembly 58. The cam surface 66 has a maximum rise position 70 angularly spaced from the at rest closed position of valve 56 by the amount A. The cam surface 68 has a maximum rise surface 72 angularly disposed from the at rest closed position of valve 58 of the angular dimension B. As is apparent in FIG. 1, angle B is greater than angle A.

When the clutch assembly 24 is transmitting engine torque or positive torque, the pressure plate 30 will be angularly displaced relative to the damper output 38 in the direction of Arrow C. During this operation, it is apparent that the cam surfaces 66 and 68 have no effect upon the respective valve assemblies 56 and 58 and therefore the valve assemblies will remain closed and the clutch is fully engaged. If the vehicle is placed in a coast condition, the output 38 and therefore equalizer housing 44 will rotate relative to the pressure plate 30 in the direction of Arrow C such that cam surfaces 66 and 68 will begin engagement with the respective valve assemblies. When this relative angular displacement has reached the amount represented by angle A, the valve assembly 56 will be fully opened. However, the valve assembly 58 will only be partially opened. The opening or actuation of valve assemblies 56 and 58 is occasioned by the cam elements 64 coacting with the cam surfaces 66 and 68 to urge valve assemblies 56 and 58, respectively, from their sealing or closed position. The opening of valve assembly 56 provides a controlled flow relationship between the apply chamber 26 and the release chamber 28 such that release of clutch 24 will be initiated. As the reverse torque increases, the valve assembly 58 will become fully opened, thereby increasing the flow relationship between the clutch chambers.

It has been found that the simultaneous opening of the poppet valves provides a rapid build-up of pressure in the release chamber 28 giving an initial clutch release. However, this pressure decays slightly and results in a driveline disturbance which is felt by the operator. It has been found that the staggered or sequential opening of the valve assemblies provides a more constant pressure level within the release chamber 28 and eliminates the driveline disturbance.

The present system has been used with a 5.7 L diesel engine to eliminate the driveline disturbance. In such a system using a 298 mm diameter torque converter, angle A was established as being operable to provide smooth disengagement in the range of 1° to 5°. A 5° differential between angles A and B was found to be effective. These angular relationships will vary depending upon the amount of torque transmitted during torque reversal. However, those skilled in the art will be readily aware of this requirement. The sequential opening of the valve assemblies 56 and 58 can be controlled either by the shape of their respective cam surfaces or by the position at which the respective cam surfaces are secured to the equalizer housing 44. If a more rapid valve control is desired, the cam surfaces can be connected to the damper output members rather than the equalizer housing since the damper output member is the first component to respond to torque reversal. Fine tuning of the clutch release can be attained by utilizing different size openings 48 and 50. For example, the first operable opening 48 can be made smaller than second operable opening 50 thus establishing a flow relationship slightly varying from the relationship found when equal size openings are used.

The apply and release of clutch 24 is also controlled by a number of other factors such as engine operating temperature, transmission gear ratio and vehicle speed. If these other operating factors do not permit the clutch to be engaged, it is apparent that the torque reversal valve mechanism will be inoperative and, of course, unnecessary if the clutch is in the disengaged position when torque reversal occurs.

The embodiments of the invention in which an exclusive property or privilege is claimed are defined as follows:

1. A torque converter clutch and release valve assembly, subjected to either engine driven forward torque or vehicle driven reverse torque during clutch engagement, comprising; a torque converter; a clutch pressure plate disposed in the torque converter and bounded by an apply chamber on one side and a release chamber on the other side, said pressure plate engaging the input of the torque converter when the apply chamber is pressurized and the release chamber is exhausted; a vibration damper mechanism drivingly connected between the clutch pressure plate and the torque converter; a pair of valve means disposed on said pressure plate for normally preventing communication between the apply and release chambers when forward torque is being transmitted, sequential release means on said damper mechanism comprising first actuator cam means for opening one of said valve means when a predetermined amount of reverse torque is transmitted for providing controlled fluid communication between the apply and release chambers to effectively increase the pressure level of the release chamber; and second actuator cam means for opening the other of said valve means when a predetermined increase in the amount of reverse torque from the predetermined amount is present for providing increased fluid communication between the apply and release chambers.

2. A torque converter clutch and release valve assembly, subjected to either engine driven forward torque or vehicle driven reverse torque during clutch engagement, comprising: a torque converter; a clutch pressure plate disposed in the torque converter and bounded by an apply chamber on one side and a release chamber on the other side, said pressure plate engaging the input of the torque converter when the apply chamber is pressurized and the release chamber is exhausted; a vibration damper mechanism drivingly connected between the clutch pressure plate and the torque converter; a pair of valve means disposed on said pressure plate for normally preventing communication between the apply and release chambers when forward torque is being transmitted with each valve means controlling a respective opening in said pressure plate with one of said openings being larger than the other; sequential release means on said damper mechanism comprising first actuator cam means for opening one of said valve means when a predetermined amount of reverse torque is transmitted for providing controlled fluid communcation between the apply and release chambers to effectively increase the pressure level of the release chamber; and second actuator cam means for opening the other of said valve means when a predetermined increase in the amount of reverse torque from the predetermined amount is present for providing increased fluid communications between the apply and release chambers.

3. A torque converter clutch and release valve assembly, subjected to either engine driven forward torque or vehicle driven reverse torque during clutch engagement, comprising; a torque converter; a clutch pressure plate disposed in the torque converter and bounded by an apply chamber on one side and a release chamber on the other side, said pressure plate engaging the input of the torque converter when the apply chamber is pressurized and the release chamber is exhausted; a vibration damper mechanism drivingly connected between the clutch pressure plate and the torque converter; a pair of valve means disposed on said pressure plate for normally preventing communication between the apply and release chambers when forward torque is being transmitted; sequential release means on said damper mechanism comprising first actuator cam means for opening one of said valve means when a predetermined amount of reverse torque is transmitted resulting in an angular displacement of 1° to 5° between said release means and said valve means for providing controlled fluid communication between the apply and release chambers to effectively increase the pressure level of the release chamber; and second actuator cam means for opening the other of said valve means when a predetermined increase in the amount of reverse torque from the predetermined amount is present resulting in an additional 5° angular displacement for providing increased fluid communication between the apply and release chambers.

4. A torque converter clutch and release valve assembly, subjected to either engine driven forward torque or vehicle driven reverse torque during clutch engagement, comprising; a torque converter; a clutch pressure plate disposed in the torque converter and bounded by an apply chamber on one side and a release chamber on the other side, said pressure plate engaging the input of the torque converter when the apply chamber is pressurized and the release chamber is exhausted; a vibration damper mechanism drivingly connected between the clutch pressure plate and the torque converter; a plurality of valve means dispose on said pressure plate for normally preventing communication between the apply and release chamber when forward torque is being transmitted; and release means operatively connected between said damper mechanism and each of said valve means for sequentially opening at least two of said valve means during reverse torque transmission to provide controlled fluid communication between said apply chamber and said release chamber.

5. A torque converter clutch and release valve assembly, subjected to either engine driven forward torque or vehicle driven reverse torque during clutch engagement, comprising; a torque converter; a clutch pressure plate disposed in the torque converter and bounded by an apply chamber on one side and a release chamber on the other side, said pressure plate engaging the input of the torque converter when the apply chamber is pressurized and the release chamber is exhausted; a vibration damper mechanism drivingly connected between the clutch pressure plate and the torque converter; a pair of valve means disposed on said pressure plate for normally preventing communication between the apply and release chamber when forward torque is being transmitted; and release means operatively connected between said damper mechanism and said valve means for sequentially opening said valve means during reverse torque transmission at an interval of 5° rotation between said release means and said valve means to provide controlled fluid communication between said apply chamber and said release chamber.

* * * * *

UNITED STATES PATENT AND TRADEMARK OFFICE
CERTIFICATE OF CORRECTION

PATENT NO. : 4,427,099
DATED : January 24, 1984
INVENTOR(S) : Richard J. Van Ee

It is certified that error appears in the above-identified patent and that said Letters Patent is hereby corrected as shown below:

Column 2, line 45, "pressure coating" should read
-- pressure operating --.

Column 4, lines 45 -46, "communications" should read
-- communication --.

Column 5, line 19, "plurality of valve means dispose" should read -- plurality of valve means disposed --.

Signed and Sealed this

Sixth Day of November 1984

[SEAL]

Attest:

GERALD J. MOSSINGHOFF

Attesting Officer

Commissioner of Patents and Trademarks